(12) United States Patent
Bodas et al.

(10) Patent No.: US 9,673,885 B2
(45) Date of Patent: Jun. 6, 2017

(54) PUSH-BASED RELAY SELECTION FOR DEVICE-TO-DEVICE COMMUNICATION

(71) Applicant: QUALCOMM Incorporated, San Diego, CA (US)

(72) Inventors: Shreeshankar Ravishankar Bodas, Belle Mead, NJ (US); Hua Wang, Basking Ridge, NJ (US); Junyi Li, Chester, NJ (US)

(*) Notice: Subject to any disclaimer, the term of this patent is extended or adjusted under 35 U.S.C. 154(b) by 62 days.

(21) Appl. No.: 14/717,673

(22) Filed: May 20, 2015

(65) Prior Publication Data

US 2016/0261332 A1    Sep. 8, 2016

Related U.S. Application Data

(60) Provisional application No. 62/127,403, filed on Mar. 3, 2015.

(51) Int. Cl.
*H04B 7/155* (2006.01)
*H04W 40/24* (2009.01)
(Continued)

(52) U.S. Cl.
CPC ....... *H04B 7/15507* (2013.01); *H04B 17/309* (2015.01); *H04L 43/0882* (2013.01);
(Continued)

(58) Field of Classification Search
CPC ............. H04B 7/15507; H04B 17/309; H04L 43/0882; H04W 8/005; H04W 40/244;
(Continued)

(56) References Cited

U.S. PATENT DOCUMENTS

2010/0329190 A1* 12/2010 Miao .................... H04W 40/02
370/328
2011/0134828 A1   6/2011 Osseiran et al.
(Continued)

FOREIGN PATENT DOCUMENTS

EP        2782293 A1     9/2014
WO    WO-2015119538 A1   8/2015

OTHER PUBLICATIONS

Xia W., et al., "Relay Selection Strategy for Device to Device Communication," IET International Conference on Information and Communications Technologies (IETICT 2013), 2013, pp. 318-323.
(Continued)

*Primary Examiner* — Kashif Siddiqui
*Assistant Examiner* — Minjung Kim
(74) *Attorney, Agent, or Firm* — Qualcomm IP Department; James H. Yancey, Jr.

(57) ABSTRACT

Techniques are described for wireless communication. One method includes estimating a pathloss from each of a plurality of relay candidates to a first communication device to generate a first capacity estimate for the first communication device for each of the plurality of relay candidates; receiving at the first communication device, from a second communication device, a second capacity estimate for the second communication device for each of the plurality of relay candidates; and selecting a relay from the plurality of relay candidates for relaying communications between the first communication device and the second communication device based at least in part on each first capacity estimate for the first communication device and each second capacity estimate for the second communication device.

30 Claims, 10 Drawing Sheets

(51) Int. Cl.
*H04W 88/04* (2009.01)
*H04W 76/02* (2009.01)
*H04B 17/309* (2015.01)
*H04L 12/26* (2006.01)
*H04W 84/04* (2009.01)

(52) U.S. Cl.
CPC ....... *H04W 40/244* (2013.01); *H04W 40/246* (2013.01); *H04W 76/023* (2013.01); *H04W 88/04* (2013.01); *H04L 43/12* (2013.01); *H04W 84/047* (2013.01)

(58) Field of Classification Search
CPC .. H04W 76/023; H04W 40/246; H04W 88/04
See application file for complete search history.

(56) References Cited

U.S. PATENT DOCUMENTS

| | | | |
|---|---|---|---|
| 2012/0230247 A1 | 9/2012 | Kwon et al. | |
| 2012/0275326 A1* | 11/2012 | Vedantham | H04B 3/544 370/252 |
| 2014/0171062 A1 | 6/2014 | Fallgren et al. | |
| 2014/0329535 A1 | 11/2014 | Sadiq et al. | |
| 2016/0183271 A1* | 6/2016 | Zhou | H04B 17/309 370/315 |

OTHER PUBLICATIONS

Zhengwen C., et al., "Research on Relay Selection in Device-to-Device Communications Based on Maximum Capacity," International Conference on Information Science, Electronics and Electrical Engineering (ISEEE), 2014, pp. 1429-1434.

ISA/EPO, International Search Report and Written Opinion of the International Searching Authority, Int'l. App. No. PCT/US2016/018850, May 3, 2016, European Patent Office, Rijswijk, NL, 12 pgs.

Sony, "Considerations on ProSe Relays Selection," SA WG2 Temporary Document, SA WG2 Meeting #105, S2-143134, Sapporo, Japan, Oct. 13-17, 2014, 7 pgs., 3rd Generation Partnership Project.

* cited by examiner

PUSH-BASED RELAY SELECTION FOR DEVICE-TO-DEVICE COMMUNICATION

CROSS REFERENCES

The present application for patent claims priority to U.S. Provisional Patent Application No. 62/127,403 by Bodas et al., entitled "PUSH-Based Relay Selection for Device-To-Device Communication," filed Mar. 3, 2015, assigned to the assignee hereof, and expressly incorporated by reference herein.

BACKGROUND

Field of the Disclosure

The present disclosure, for example, relates to wireless communication systems, and more particularly to the selection of a relay for device-to-device (D2D) communication.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from the base station to the UEs) and uplink channels (e.g., for transmissions from the UEs to the base station). A wireless multiple-access communication system may also, or alternatively, support device-to-device (D2D) communication between communication devices (e.g., between UEs). D2D communications may involve wireless communications directly between communication devices (e.g., directly between UEs, without the communications passing through one or more base stations). However, D2D communications may sometimes be relayed through one or more intermediary communication devices (e.g., through one or more relays).

A relay may take the form of a dedicated relay device or be part of another device. For example, UE may function as a relay, and may relay D2D communications between other UEs. In some cases, multiple candidate relays may be available between two endpoint devices, but not all relay candidates may provide the same advantages, and some relay candidates may not provide any advantage. There may be no way for the endpoint devices to identify which of the candidate relays would provide the best service between the two endpoint devices, and the selection of a relay device may be unnecessarily arbitrary.

SUMMARY

The present disclosure generally relates to one or more improved systems, methods, and/or apparatuses for selecting a relay for device-to-device (D2D) communication. According to various examples, a first communication device may select a relay for communication with a second communication device to improve communication with the second communication device (e.g., to achieve a higher data rate, lower latency, range extension, etc.). However, not all relay candidates may provide the same advantages, and some relay candidates may not provide any advantage. In this regard, a PUSH-based relay selection process and related control signaling are described in the present disclosure.

In accordance with a PUSH-based relay selection process, relay candidates may periodically transmit beacons announcing their availability. Each of a number of source and destination communication devices may then estimate a pathloss, from each of the plurality of relay candidates to the source or destination communication device, to generate a capacity estimate for the source or destination communication device for each of the plurality of relay candidates. A source and destination communication device communicating (or desiring to communicate) using D2D communication may then select a relay, from among the plurality of relay candidates, based on their combined capacity estimates for each relay candidate (e.g., based on an end-to-end link capacity for each relay candidate).

In a first set of illustrative examples, a method for wireless communication is described. In one configuration, the method may include estimating a pathloss from each of a plurality of relay candidates to a first communication device to generate a first capacity estimate for the first communication device for each of the plurality of relay candidates; receiving at the first communication device, from a second communication device, a second capacity estimate for the second communication device for each of the plurality of relay candidates; and selecting a relay from the plurality of relay candidates for relaying communications between the first communication device and the second communication device based at least in part on each first capacity estimate for the first communication device and each second capacity estimate for the second communication device.

In some examples of the method, each second capacity estimate for the second communication device may be based at least in part on a pathloss from one of the plurality of relay candidates to the second communication device. In some examples, the method may further include communicating directly with the second communication device to receive each second capacity estimate for the second communication device for each of the relay candidates. In some examples, the method may further include communicating with the second communication device through the relay following selection of the relay. In some examples, the first communication device may communicate directly with the second communication device using a D2D communications protocol.

In some examples, the method may include receiving a plurality of beacon signals from the plurality of relay candidates; and the pathloss from each of the plurality of relay candidates to the first communication device may be based at least in part on one of the plurality of beacon signals. In some examples, each of the plurality of beacon signals may be received over a different time-frequency resource. In some examples, the beacon signals may be received from the plurality of relay candidates during a relay selection period. In some examples, the beacon signals may be received from the plurality of relay candidates during a plurality of relay selection periods.

In a second set of illustrative examples, an apparatus for wireless communication is described. In one configuration, the apparatus may include means for estimating a pathloss from each of a plurality of relay candidates to a first communication device to generate a first capacity estimate for the first communication device for each of the plurality of relay candidates; means for receiving at the first communication device, from a second communication device, a second capacity estimate for the second communication device for each of the plurality of relay candidates; and means for selecting a relay from the plurality of relay candidates for relaying communications between the first communication device and the second communication device based at least in part on each first capacity estimate for the first communication device and each second capacity estimate for the second communication device. In some examples, the apparatus may further include means for implementing one or more aspects of the method for wireless communication described above with respect to the first set of illustrative examples.

In a third set of illustrative examples, another apparatus for wireless communication is described. In one configuration, the apparatus may include a processor, memory in electronic communication with the processor, and instructions stored in the memory. The instructions may be executable by the processor to estimate a pathloss from each of a plurality of relay candidates to a first communication device to generate a first capacity estimate for the first communication device for each of the plurality of relay candidates; to receive at the first communication device, from a second communication device, a second capacity estimate for the second communication device for each of the plurality of relay candidates; and to select a relay from the plurality of relay candidates for relaying communications between the first communication device and the second communication device based at least in part on each first capacity estimate for the first communication device and each second capacity estimate for the second communication device. In some examples, the instructions may also be executable by the processor to implement one or more aspects of the method for wireless communication described above with respect to the first set of illustrative examples.

In a fourth set of illustrative examples, a computer-readable medium for storing instructions executable by a processor is described. In one configuration, the computer-readable medium may include instructions to estimate a pathloss from each of a plurality of relay candidates to a first communication device to generate a first capacity estimate for the first communication device for each of the plurality of relay candidates; instructions to receive at the first communication device, from a second communication device, a second capacity estimate for the second communication device for each of the plurality of relay candidates; and instructions to select a relay from the plurality of relay candidates for relaying communications between the first communication device and the second communication device based at least in part on each first capacity estimate for the first communication device and each second capacity estimate for the second communication device. In some examples, the computer-readable medium may also include instructions to implement one or more aspects of the method for wireless communication described above with respect to the first set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Features generally relating to one or more improved systems, methods, and/or apparatuses for selecting a relay for device-to-device (D2D) communication. According to various examples, a first communication device may estimate a pathloss from each of a plurality of relay candidates, to the first communication device, to generate a first capacity estimate for the first communication device for each of the plurality of relay candidates. The first communication device may also receive, from a second communication device, a second capacity estimate for the second communication device for each of the plurality of relay candidates. Based at least in part on the first capacity estimates for the first communication device and the second capacity estimates for the second communication device, the first communication device may select a relay from the plurality of relay candidates for relaying communications between the first and second communication devices.

Figure 1:
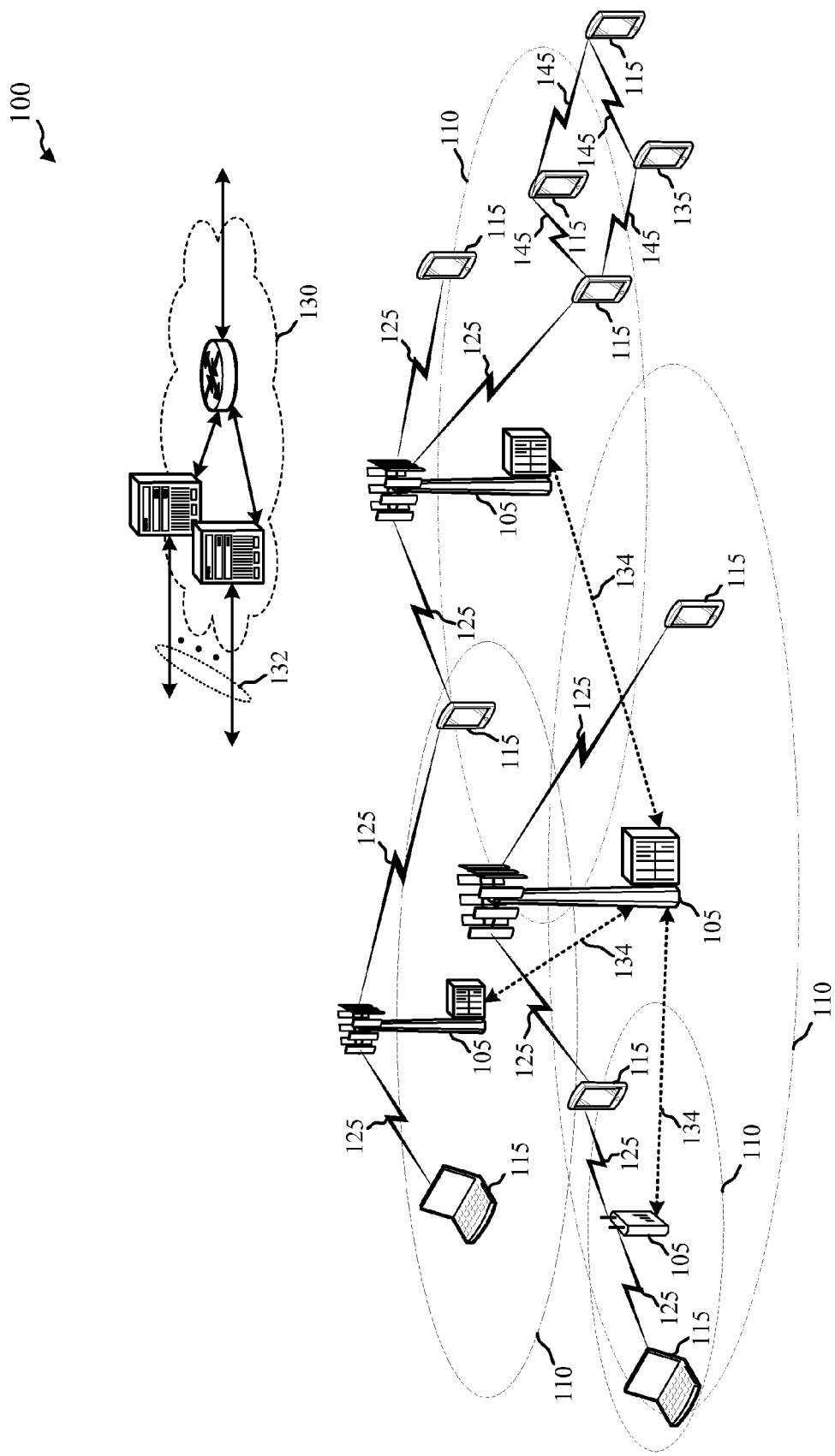
FIG. 1 illustrates an example of a wireless communications system, in accordance with various aspects of the present disclosure.

FIG. 1 illustrates an example of a wireless communications system 100, in accordance with various aspects of the present disclosure. The wireless communications system 100 includes base stations 105, communication devices (also known as user equipments (UE) 115), and a core network 130. The base stations 105 may communicate with the UEs 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The wireless communications system 100 may support operation on multiple carriers (waveform signals of different frequencies). Wireless communication links 125 may be modulated according to various radio technologies. Each modulated signal may carry control information (e.g., reference signals, control channels, etc.), overhead information, data, etc. Wireless communication links 145 may also be established between UEs 115, and between UEs 115 and relays 135, for D2D communication. D2D communication directly between two UEs 115 may be referred to as one-hop D2D communication. D2D communication between two UEs 115 through a relay 135 may be referred to as two-hop D2D communication. In some cases, a relay 135 may be an idle UE 115 (or a UE 115 that otherwise has the resources, and capacity, to serve as a relay).

The base stations 105 may wirelessly communicate with the UEs 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area. The wireless communications system 100 may include base stations 105 of different types (e.g., macro, micro, and/or pico base stations). There may be overlapping coverage areas for different technologies.

The wireless communications system 100 may be a Heterogeneous LTE/LTE-A network in which different types of base stations provide coverage for various geographical regions. For example, each base station 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell.

The core network 130 may communicate with the base stations 105 via a backhaul 132 (e.g., S1, etc.). The base stations 105 may also communicate with one another, e.g., directly or indirectly via backhaul links 134 (e.g., X2, etc.) and/or via backhaul links 132 (e.g., through core network 130). The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 may be dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. A UE may be able to communicate with other UEs directly, or through a relay, using D2D communication.

The wireless communication links 125 shown in wireless communications system 100 may include uplink (UL) transmissions from a UE 115 to a base station 105, and/or downlink (DL) transmissions, from a base station 105 to a UE 115 over DL carriers. The downlink transmissions may also be called forward link transmissions while the uplink transmissions may also be called reverse link transmissions.

In some cases, it may be useful to establish a relay 145 between a first UE 115 and a second UE 115. When there are multiple relay candidates, the first UE 115 may estimate a pathloss from each of the relay candidates to the first UE 115, thereby generating a separate capacity estimate for the first UE 115 from each of relay candidates. Additionally, the second UE 115 may similarly estimate a pathloss from each of the relay candidates to the second UE 115, thereby generating a separate capacity estimate for the second UE 115 from each of the relay candidates. The second UE 115 may transmit each of the capacity estimates for the second UE 115 to the first UE 115, and the first UE 115 may select a relay 145 based on the capacity estimates for the first UE 115 and the received capacity estimates for the second UE 115.

Figure 2:
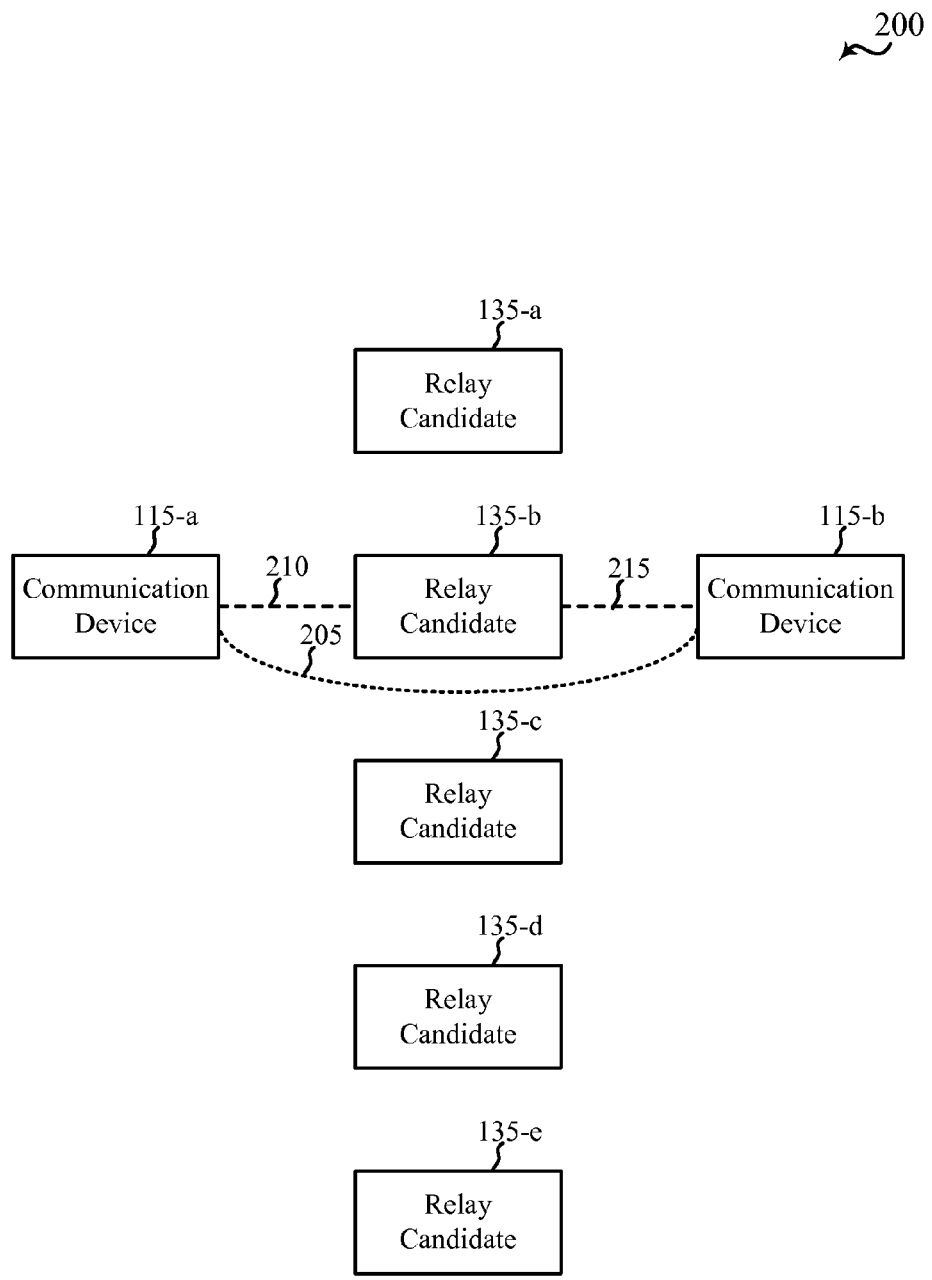
FIG. 2 shows a wireless communication system including a source communication device, a destination communication device, and a plurality of relay candidates, in accordance with various aspects of the present disclosure.

FIG. 2 shows a wireless communication system 200 including a source communication device 115-a, a destination communication device 115-b, and a plurality of relay candidates 135-a, 135-b, 135-c, 135-d, and 135-e, in accordance with various aspects of the present disclosure. Each of the first and second communication devices 115-a, 115-b may be an example of aspects of one or more of the communication devices 115 described with reference to FIG. 1. Each of the relay candidates 135-a, 135-b, 135-c, 135-d, and 135-e may be an example of aspects of one or more of the relay candidates 135 described with reference to FIG. 1.

At times, the source communication device 115-a and destination communication device 115-b may communicate with one another directly (e.g., using a D2D communications protocol over communication link 205). At other times, the source communication device 115-*a* and destination communication device 115-*b* may communicate with one another via a selected one of the relay candidates 135-*a*, 135-*b*, 135-*c*, 135-*d*, or 135-*e* (e.g., using a device-to-relay-to-device (DRD) communications protocol over communication links 210 and 215). To facilitate the selection of a relay by the source communication device 115-*a* or the destination communication device 115-*b*, each of the relay candidates 135-*a*, 135-*b*, 135-*c*, 135-*d*, and 135-*e* may transmit a beacon signal. In some examples, each beacon signal may be transmitted over a number of (e.g., one or more) time-frequency resources that differ(s) from the time-frequency resources used by other relay candidates to transmit beacon signals. Each beacon signal may be transmitted at a nominal power, to enable each communication device 115 to estimate a pathloss from a respective relay candidate 135 to the communication device 115. The beacon signals may be transmitted by the relay candidates 135-*a*, 135-*b*, 135-*c*, 135-*d*, and 135-*e* during each of a plurality of relay selection periods.

The source communication device 115-*a* may receive the beacon signals from the relay candidates 135-*a*, 135-*b*, 135-*c*, 135-*d*, and 135-*e* and estimate a pathloss from each of the relay candidates 135-*a*, 135-*b*, 135-*c*, 135-*d*, and 135-*e* to the source communication device 115-*a* to generate a first capacity estimate for the source communication device 115-*a*. In some examples, the source communication device 115-*a* may estimate the pathloss from each of the plurality of relay candidates 135-*a*, 135-*b*, 135-*c*, 135-*d*, and 135-*e* to the source communication device 115-*a* based at least in part on the plurality of beacon signals (e.g., based on measurements (e.g., measured signal strengths) of the beacon signals, which may be compared to the nominal power of the beacon signals).

The destination communication device 115-*b* may receive the beacon signals from the relay candidates 135-*a*, 135-*b*, 135-*c*, 135-*d*, and 135-*e*; estimate a pathloss from each of the relay candidates 135-*a*, 135-*b*, 135-*c*, 135-*d*, and 135-*e* to the destination communication device 115-*b* to generate a second capacity estimate for the destination communication device 115-*b*; and transmit the second capacity estimates to the source communication device 115-*a*. In some examples, the destination communication device 115-*b* may transmit the second capacity estimates directly to the source communication device 115-*a* (e.g., using a D2D communications protocol). Alternatively, one or more of the second capacity estimates may be transmitted from the destination communication device 115-*b* to the source communication device 115-*a* via one or more of the relay candidates 135-*a*, 135-*b*, 135-*c*, 135-*d*, or 135-*e*.

Upon receiving the second capacity estimates, the source communication device may select a relay from the plurality of relay candidates 135-*a*, 135-*b*, 135-*c*, 135-*d*, and 135-*e* for relaying communications between the source communication device 115-*a* and the destination communication device 115-*b*. The relay may be selected based at least in part on each first capacity estimate for the source communication device 115-*a* and each second capacity estimate for the destination communication device 115-*b* (e.g., based on end-to-end link capacity determinations). The source communication device 115-*a* may then announce the relay selection. In some examples, the announcement may be made in a broadcast announcement. In other examples, the announcement may be made in one or more transmissions to the selected relay and/or the destination communication device 115-*b*.

Following selection of one of the relay candidates 135-*a*, 135-*b*, 135-*c*, 135-*d*, or 135-*e* by the source communication device 115-*a*, the selected relay may be used for device-to-relay-to-device (DRD) communications between the source communication device 115-*a* and the destination communication device 115-*b*. In some examples of the wireless communication system 200, the relay used for communications between the source communication device 115-*a* and the destination communication device 115-*b* may be selected by the destination communication device 115-*b* instead of the source communication device 115-*a*. Also, the source communication device 115-*a* may in some cases function as a destination communication device 115-*b*, and the destination communication device 115-*b* may in some cases function as a source communication device 115-*a*. In some examples, one or more other source communication devices or destination communication devices (not shown) may also select a relay from among the plurality of relay candidates 135-*a*, 135-*b*, 135-*c*, 135-*d*, and 135-*e* for DRD communications.

Figure 3:
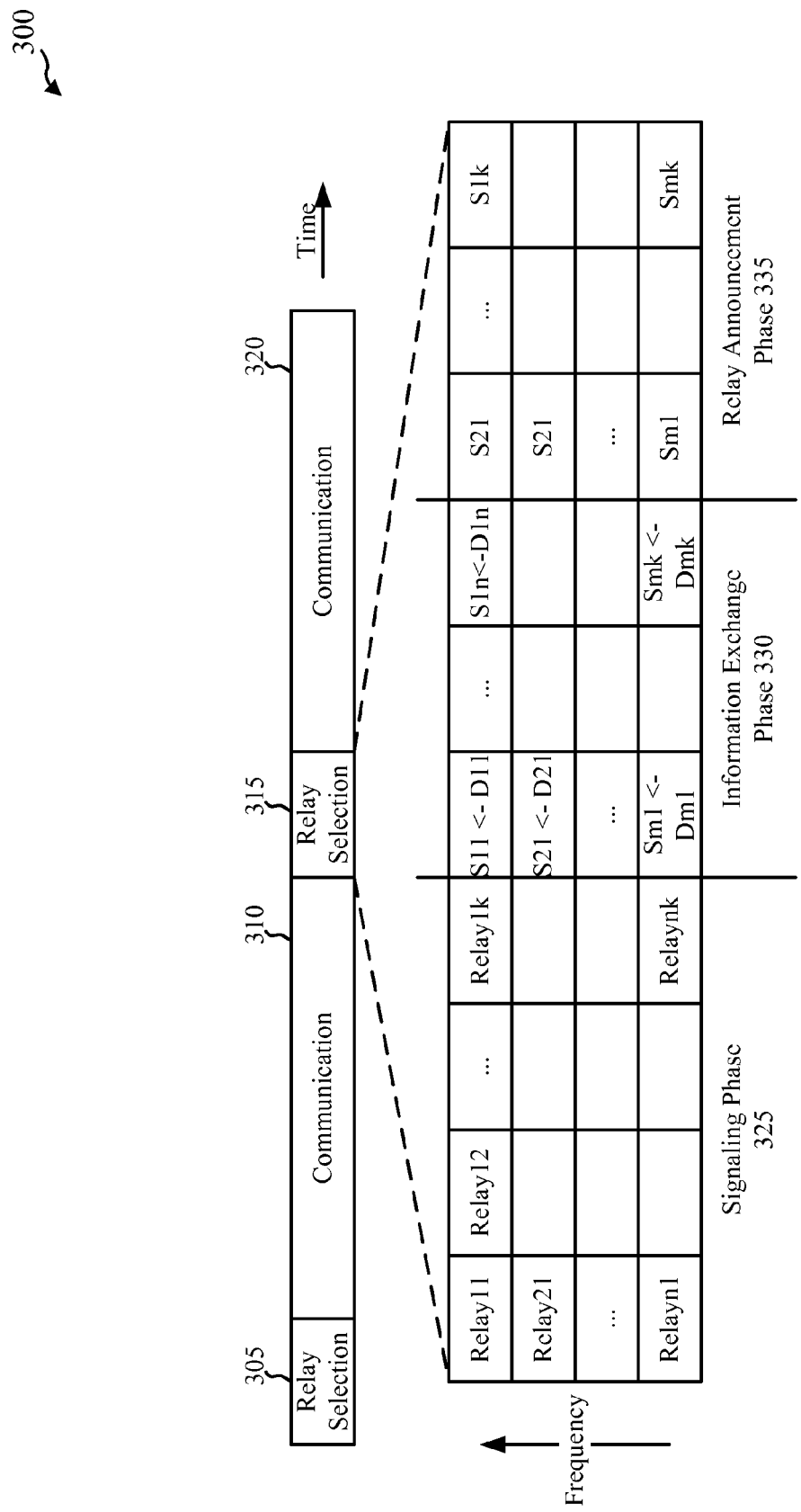
FIG. 3 shows a timing diagram of a relay selection process for wireless communication, in accordance with various aspects of the present disclosure.

FIG. 3 shows a timing diagram 300 of a relay selection process for wireless communication, in accordance with various aspects of the present disclosure. Different parts of the relay selection process may be performed, for example, by a first communication device, a second communication device, or a plurality of relay candidates. Each of the first and second communication devices may be an example of aspects of one or more of the communication devices 115 described with reference to FIG. 1 or 2. Each of the relay candidates may be an example of aspects of one or more of the relay candidates 135 described with reference to FIG. 1 or 2.

During the relay selection process shown in FIG. 3, each of a number of communication devices (e.g., a number of source (S) communication devices) may select a relay (R), for DRD communication with another communication device (e.g., a destination (D) communication device), during one or more of a number of relay selection periods 305, 315. The source communication device(s) may then communicate with the destination communication device(s), through the relay(s), during one or more communication periods 310, 320. In some cases, the source communication device(s) may also communicate with the destination device(s) during the relay selection periods 305, 315. One or more source communication device and destination communication device may also communicate directly, during the relay selection periods 305, 315 or communication periods 310, 320, using a D2D communications protocol.

A relay selection period (e.g., relay selection period 315) may include three phases of operation: a signaling phase 325, an information exchange phase 330, and a relay announcement phase 335. During the signaling phase 325, each of a plurality of relay candidates may transmit a beacon signal. Each beacon signal may be transmitted over a number of time-frequency resources. In some examples, the time-frequency resource(s) used by one relay candidate (e.g., Relay11) for the transmission of a beacon signal may differ from the time-frequency resources used by other relay candidates (e.g., Relay21, Relay12, . . . , Relaynk) for the transmission of beacon signals (or differ from the time-frequency resources used by a number of nearest neighbor relay candidates). Each beacon signal may be transmitted at a nominal power, to enable each source (S) and destination (D) communication devices to estimate a pathloss from each relay candidate to the communication device. Also during the signaling phase 325, or during the information exchange phase 330, each of the source and destination communication devices may estimate the pathloss from each relay candidate to the respective communication device, to generate a capacity estimate for the communication device for each of the plurality of relay candidates.

During the information exchange phase 330, and for each destination (D) communication device (e.g., each destination communication device D11 . . . Dmk) desiring to communicate with a destination communication device through a relay, the destination communication device may transmit its capacity estimates to a source communication device with which the destination communication device is in D2D communication (e.g., each source communication device S11. . . Smk). Also during the information exchange phase 330, or during the relay announcement phase 335, each source (S) communication device may select a relay from the plurality of relay candidates for relaying communications between the source communication device and a respective destination communication device. The relay may be selected based at least in part on 1) the capacity estimates for the source communication device for each relay candidate, and 2) the capacity estimates for the destination communication device for each relay candidate (e.g., the relay selection may be based on end-to-end link capacity determinations).

During the relay announcement phase 335, each source (S) communication device may announce its relay selection. Each relay selection may be announced during a different time-frequency resource (or resources). For example, the source communication device S11 may announce its relay selection during the time-frequency resource(s) of the relay announcement phase 335 labeled S11, and the source communication device Smk may announce its relay selection during the time-frequency resource(s) of the relay announcement phase labeled Smk.

In practice, there may be different numbers of the various devices (e.g., source communication device, destination communication devices, and relay candidates), and different overlapping or non-overlapping subsets of the devices may participate in relay selection during each relay selection period (e.g., during the relay selection period 305 or 315).

Figure 4:
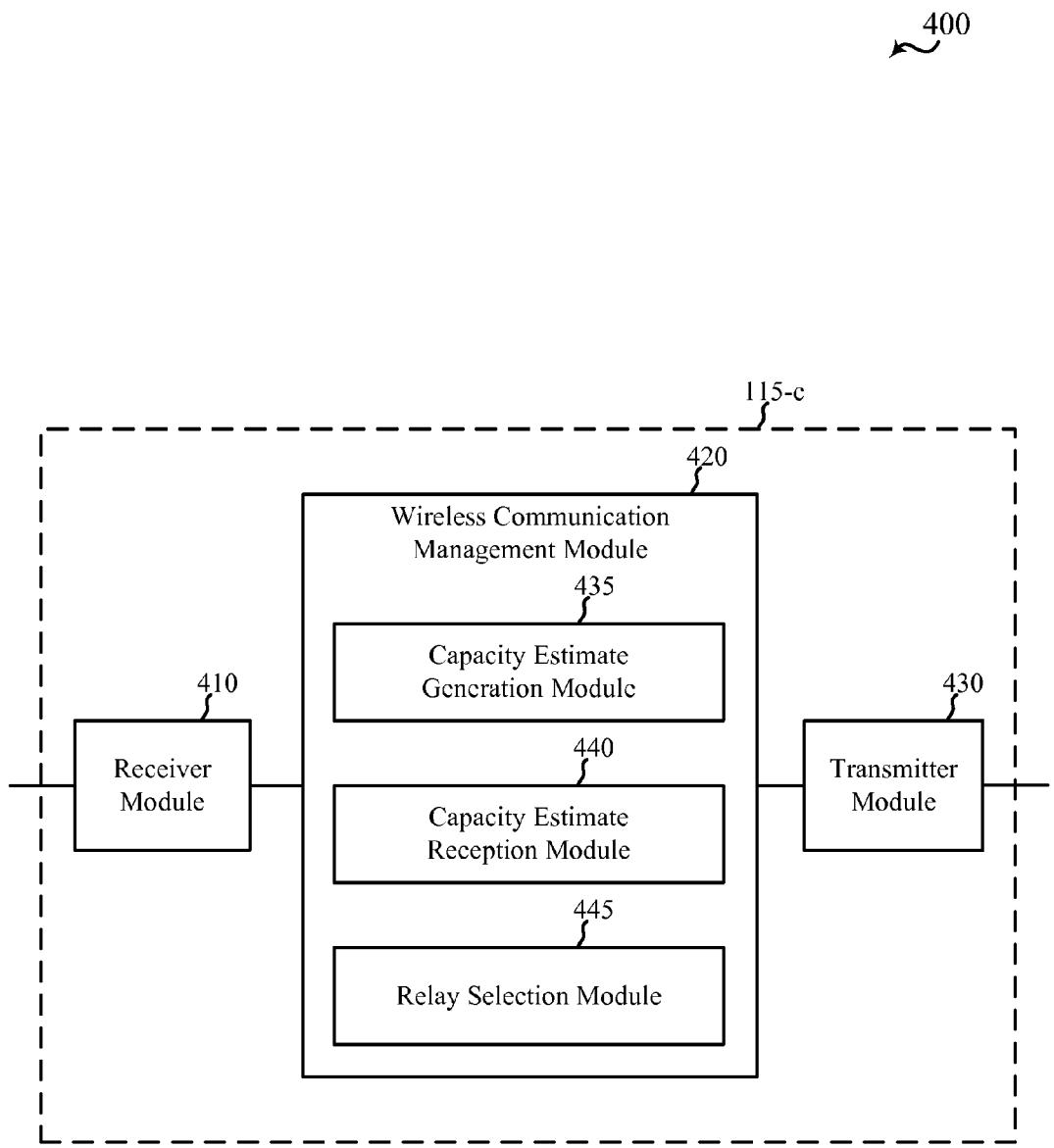
FIG. 4 shows a block diagram of a first communication device for use in wireless communication, in accordance with various aspects of the present disclosure.

FIG. 4 shows a block diagram 400 of a first communication device 115-c for use in wireless communication, in accordance with various aspects of the present disclosure. The first communication device 115-c may be an example of aspects of one or more of the communication devices 115 described with reference to FIG. 1 or 2. The first communication device 115-c may also be or include a processor. The first communication device 115-c may include a receiver module 410, a wireless communication management module 420, or a transmitter module 430. Each of these modules may be in communication with each other.

The modules of the first communication device 115-c may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 410 may include at least one radio frequency (RF) receiver. The receiver module 410 or RF receiver may be used to receive various types of data or control signals (i.e., transmissions) over one or more communication links of a wireless communication system, such as one or more communication links of the wireless communication system 100 or 200 described with reference to FIG. 1 or 2.

In some examples, the transmitter module 430 may include at least one RF transmitter. The transmitter module 430 or RF transmitter may be used to transmit various types of data or control signals (i.e., transmissions) over one or more communication links of a wireless communication system, such as one or more communication links of the wireless communication system 100 or 200 described with reference to FIG. 1 or 2.

The wireless communication management module 420 may be used to manage one or more aspects of wireless communication for the first communication device 115-c. In some examples, the wireless communication management module 420 may include a capacity estimate generation module 435, a capacity estimate reception module 440, or a relay selection module 445.

The capacity estimate generation module 435 may be used to estimate a pathloss from each of a plurality of relay candidates to the first communication device 115-c to generate a first capacity estimate for the first communication device 115-c for each of the plurality of relay candidates.

The capacity estimate reception module 440 may be used to receive, from a second communication device, a second capacity estimate for the second communication device for each of the plurality of relay candidates. In some examples, the second capacity estimates may be received via the receiver module 410. In some examples, each second capacity estimate may be based at least in part on a pathloss from one of the plurality of relay candidates to the second communication device.

The relay selection module 445 may be used to select a relay from the plurality of relay candidates for relaying communications between the first communication device 115-c and the second communication device. The relay may be selected based at least in part on each first capacity estimate for the first communication device 115-c and each second capacity estimate for the second communication device (e.g., based on end-to-end link capacity determinations).

In some examples, the first communication device 115-c may be a source communication device, such as the source communication device 115-a described with reference to FIG. 2, and the second communication device may be a destination communication device, such as the destination communication device 115-b described with reference to FIG. 2. In other examples, the first communication device 115-c may be a destination communication device, such as the destination communication device 115-b described with reference to FIG. 2, and the second communication device may be a source communication device, such as the source communication device 115-a described with reference to FIG. 2. In either example, the plurality of relay candidates may be examples of aspects of the relay candidates 135 described with reference to FIG. 1 or 2.

Figure 5:
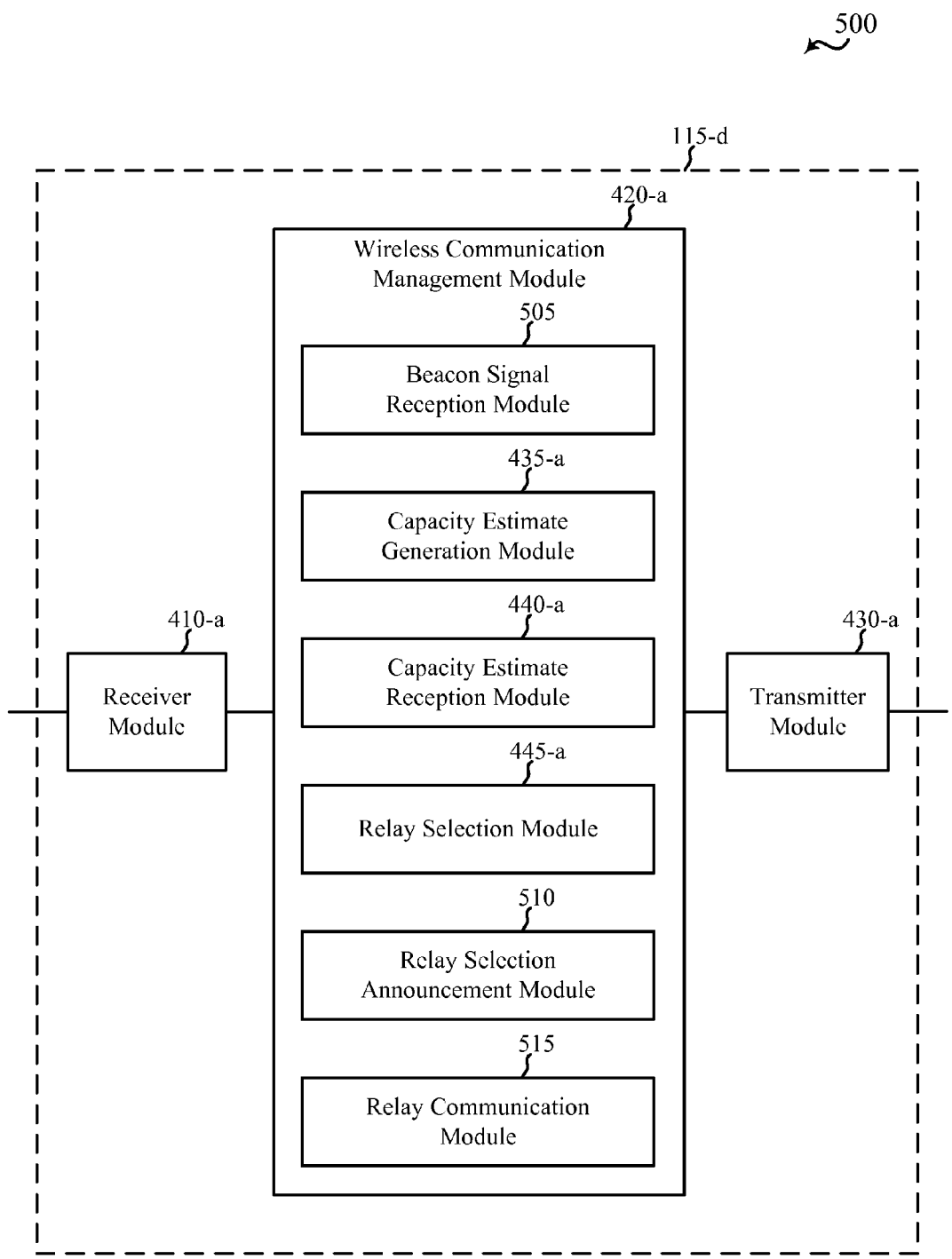
FIG. 5 shows a block diagram of a first communication device for use in wireless communication, in accordance with various aspects of the present disclosure.

FIG. 5 shows a block diagram 500 of a first communication device 115-d for use in wireless communication, in accordance with various aspects of the present disclosure.

The first communication device 115-*d* may be an example of aspects of one or more of the communication devices 115 described with reference to FIG. 1, 2, or 4. The first communication device 115-*d* may also be or include a processor. The first communication device 115-*d* may include a receiver module 410-*a*, a wireless communication management module 420-*a*, or a transmitter module 430-*a*. Each of these modules may be in communication with each other. In some examples, the receiver module 410-*a* and transmitter module 430-*a* may be examples of the receiver module 410 and transmitter module 430 described with reference to FIG. 4.

The modules of the first communication device 115-*d* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each module may also be implemented, in whole or in part, with instructions embodied in a memory, formatted to be executed by one or more general or application-specific processors.

The wireless communication management module 420-*a* may be used to manage one or more aspects of wireless communication for the first communication device 115-*d*. In some examples, the wireless communication management module 420-*a* may include a beacon signal reception module 505, a capacity estimate generation module 435-*a*, a capacity estimate reception module 440-*a*, or a relay selection module 445-*a*, a relay selection announcement module 510, or a relay communication module 515.

The beacon signal reception module 505 may be used to receive a plurality of beacon signals from a plurality of relay candidates. In some examples, each of the plurality of beacon signals may be received over a different time-frequency resource (or resources). In some examples, the beacon signals may be received via the receiver module 410-*a*. Each beacon signal may be transmitted at a nominal power, to enable the first communication device 115-*d* to estimate a pathloss from each of the plurality of relay candidates to the first communication device 115-*d*. Other communication devices may also receive the beacon signals and estimate a pathloss from each of the plurality of relay candidates (or a subset thereof) to each of the other communication devices. The beacon signals may be received from the plurality of relay candidates during a one or a plurality of relay selection periods.

The capacity estimate generation module 435-*a* may be used to estimate a pathloss from each of a plurality of relay candidates to the first communication device 115-*b* to generate a first capacity estimate for the first communication device 115-*b* for each of the plurality of relay candidates. In some examples, the first communication device 115-*d* may estimate the pathloss from each of the plurality of relay candidates to the first communication device 115-*d* based at least in part on the plurality of beacon signals (e.g., based on measurements (e.g., measured signal strengths) of the beacon signals, which may be compared to the nominal power of the beacon signals).

The capacity estimate reception module 440-*a* may be used to receive, from a second communication device, a second capacity estimate for the second communication device for each of the plurality of relay candidates. In some examples, the second capacity estimates may be received via the receiver module 410-*a*. The second capacity estimates may be received from the second communication device during a one or a plurality of relay selection periods (e.g., different sets of second capacity estimates may be received during different relay selection periods). In some examples, each second capacity estimate may be based at least in part on a pathloss from one of the plurality of relay candidates to the second communication device. In some examples, the first communication device 115-*d* may communicate directly with the second communication device (e.g., using a D2D communications protocol) to receive each second capacity estimate. Alternatively, one or more of the second capacity estimates may be received from, or via, one or more of the relay candidates.

In some examples, the first communication device 115-*d* may generate a first capacity estimate for each of one or more relay candidates for which it does not receive a second capacity estimate. The first communication device 115-*d* may also receive a second capacity estimate for each of one or more relay candidates for which it does not generate a first capacity estimate.

The relay selection module 445-*a* may be used to select a relay from the plurality of relay candidates for relaying communications between the first communication device 115-*d* and the second communication device. The relay may be selected based at least in part on each first capacity estimate for the first communication device 115-*d* and each second capacity estimate for the second communication device (e.g., based on end-to-end link capacity determinations).

The relay selection announcement module 510 may be used to announce the relay selection made by the relay selection module 445-*a*. In some examples, the announcement may be made in a broadcast announcement. In other examples, the announcement may be made in one or more transmissions to the selected relay and/or the second communication device. The announcement may be made via the transmitter module 430-*a*.

The relay communication module 515 may be used, following selection of the relay, to communicate with the second communication device, through the selected relay, via the receiver module 410-*a* and transmitter module 430-*a*.

In some examples, the first communication device 115-*d* may be a source communication device, such as the source communication device 115-*a* described with reference to FIG. 2, and the second communication device may be a destination communication device, such as the destination communication device 115-*b* described with reference to FIG. 2. In other examples, the first communication device 115-*d* may be a destination communication device, such as the destination communication device 115-*b* described with reference to FIG. 2, and the second communication device may be a source communication device, such as the source communication device 115-*a* described with reference to FIG. 2. In either example, the plurality of relay candidates may be examples of aspects of the relay candidates 135 described with reference to FIG. 1 or 2.

Figure 6:
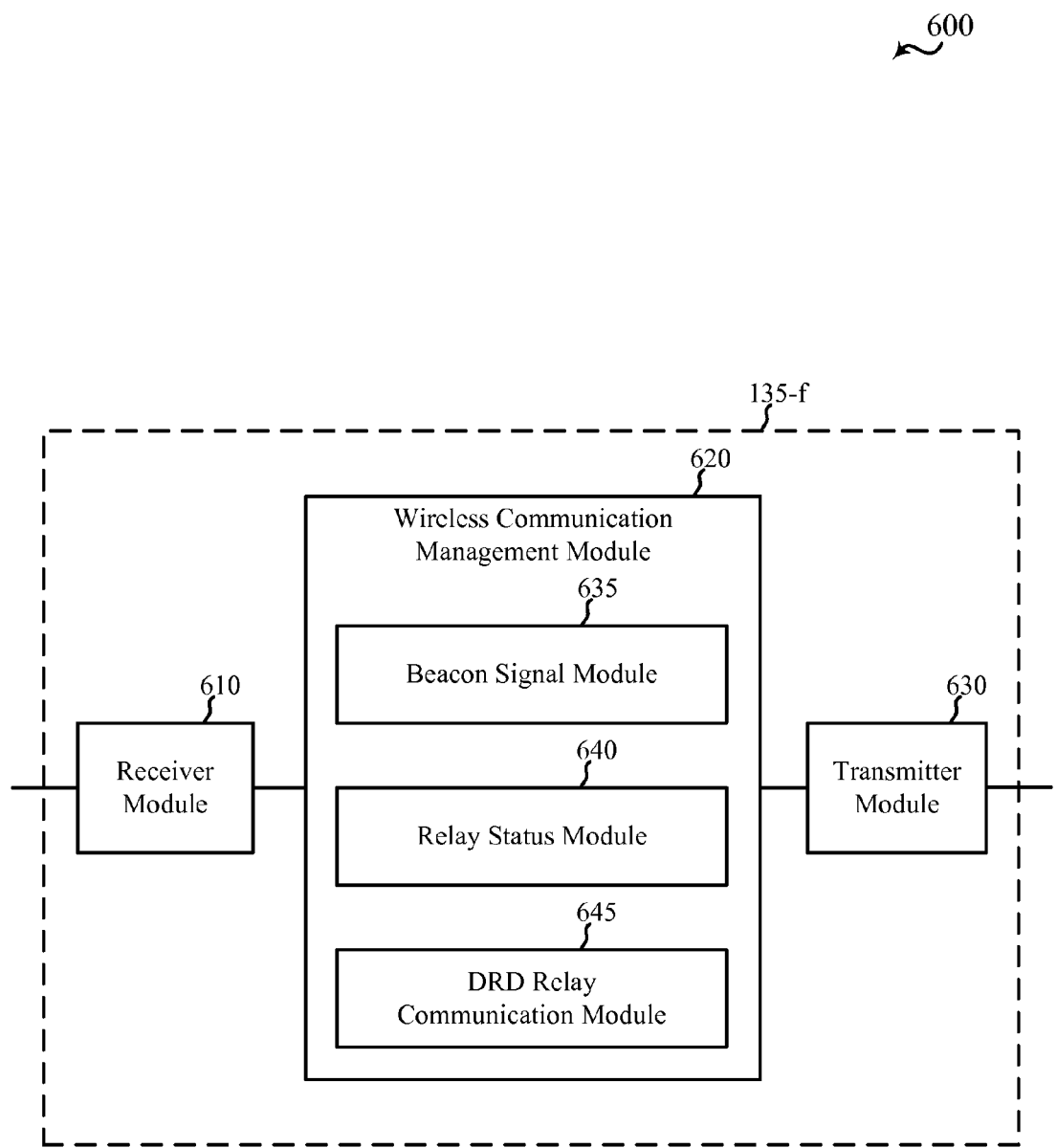
FIG. 6 shows a block diagram of a relay candidate for use in wireless communication, in accordance with various aspects of the present disclosure.

FIG. 6 shows a block diagram 600 of a relay candidate 135-*f* for use in wireless communication, in accordance with various aspects of the present disclosure. The relay candidate 135-*f* may be an example of aspects of one or more of the relay candidates 135 described with reference to FIG. 1 or 2. The relay candidate 135-*f* may also be or include a processor. The relay candidate 135-*f* may include a receiver module 610, a wireless communication management module 620, or a transmitter module 630. Each of these modules may be in communication with each other.

The modules of the relay candidate 135-*f* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 610 may include at least one RF receiver. The receiver module 610 or RF receiver may be used to receive various types of data or control signals (i.e., transmissions) over one or more communication links of a wireless communication system, such as one or more communication links of the wireless communication system 100 or 200 described with reference to FIG. 1 or 2.

In some examples, the transmitter module 630 may include at least one RF transmitter. The transmitter module 630 or RF transmitter may be used to transmit various types of data or control signals (i.e., transmissions) over one or more communication links of a wireless communication system, such as one or more communication links of the wireless communication system 100 or 200 described with reference to FIG. 1 or 2.

The wireless communication management module 620 may be used to manage one or more aspects of wireless communication for the relay candidate 135-*f*. In some examples, the wireless communication management module 620 may include a beacon signal module 635, a relay status module 640, or a DRD relay communication module 645.

The beacon signal module 635 may be used to transmit a beacon signal. In some examples, the beacon signal may be transmitted over a number of time-frequency resources that differ(s) from the time-frequency resources used by other relay candidates to transmit beacon signals. In some examples, the beacon signal may be transmitted via the transmitter module 630. The beacon signal may be transmitted at a nominal power, to enable communication devices, such as the communication devices 115 described with reference to FIG. 1, 2, 4, or 5, to each estimate a pathloss from the relay candidate 135-*f* to the communication device. The beacon signal may be transmitted from the relay candidate 135-*f* during each of a plurality of relay selection periods.

The relay status module 640 may be used to receive a relay selection announcement from each of one or more communication devices that have selected the relay candidate 135-*f* as a relay for DRD communications. In some cases, a relay selection announcement may be received from a source communication device. In some cases, a relay selection announcement may be received from a destination communication device. The relay selection announcement(s) may be received via the receiver module 610.

The DRD relay communication module 645 may be used to relay communications between communication devices using the relay candidate 135-*f* for DRD communications.

Figure 7:
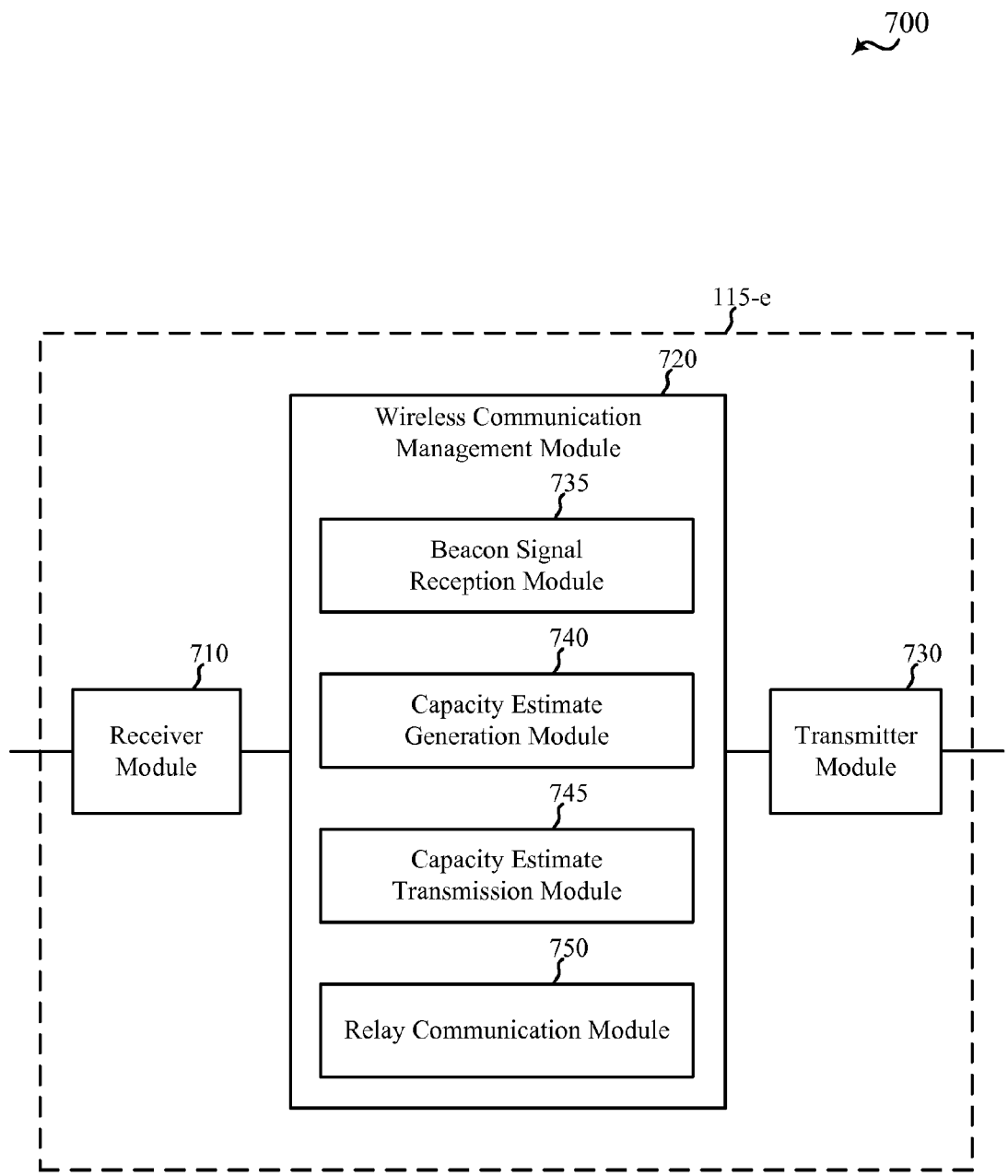
FIG. 7 shows a block diagram of a second communication device, for use in wireless communication with a first communication device, in accordance with various aspects of the present disclosure.

FIG. 7 shows a block diagram 700 of a second communication device 115-*e*, for use in wireless communication with a first communication device, in accordance with various aspects of the present disclosure. The second communication device 115-*e* may be an example of aspects of one or more of the communication devices 115 described with reference to FIG. 1 or 2. The second communication device 115-*e* may also be or include a processor. The second communication device 115-*e* may include a receiver module 710, a wireless communication management module 720, or a transmitter module 730. Each of these modules may be in communication with each other.

The modules of the second communication device 115-*e* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 710 may include at least one RF receiver. The receiver module 710 or RF receiver may be used to receive various types of data or control signals (i.e., transmissions) over one or more communication links of a wireless communication system, such as one or more communication links of the wireless communication system 100 or 200 described with reference to FIG. 1 or 2.

In some examples, the transmitter module 730 may include at least one RF transmitter. The transmitter module 730 or RF transmitter may be used to transmit various types of data or control signals (i.e., transmissions) over one or more communication links of a wireless communication system, such as one or more communication links of the wireless communication system 100 or 200 described with reference to FIG. 1 or 2.

The wireless communication management module 720 may be used to manage one or more aspects of wireless communication for the second communication device 115-*e*. In some examples, the wireless communication management module 720 may include a beacon signal reception module 735, a capacity estimate generation module 740, a capacity estimate transmission module 745, or a relay communication module 750.

The beacon signal reception module 735 may be used to receive a plurality of beacon signals from a plurality of relay candidates. In some examples, each of the plurality of beacon signals may be received over a different time-frequency resource (or resources). In some examples, the beacon signals may be received via the receiver module 710. Each beacon signal may be transmitted at a nominal power, to enable the second communication device 115-*e* to estimate a pathloss from each of the plurality of relay candidates to the second communication device 115-*e*. The beacon signals may be received from the plurality of relay candidates during a one or a plurality of relay selection periods.

The capacity estimate generation module 740 may be used to estimate a pathloss from each of a plurality of relay candidates to the second communication device 115-*e* to generate a capacity estimate for the second communication device 115-*e* for each of the plurality of relay candidates. In some examples, the second communication device 115-*e* may estimate the pathloss from each of the plurality of relay candidates to the second communication device 115-*e* based at least in part on the plurality of beacon signals (e.g., based on measurements (e.g., measured signal strengths) of the beacon signals, which may be compared to the nominal power of the beacon signals).

The capacity estimate transmission module 745 may be used to transmit, to the first communication device, a capacity estimate for the second communication device 115-*e* for each of the plurality of relay candidates. In some examples, the capacity estimates may be transmitted via the transmitter module 730. The capacity estimates may be transmitted from the second communication device 115-*e* during a one or a plurality of relay selection periods (e.g., different sets of capacity estimates may be transmitted during different relay selection periods). In some examples, the second communication device 115-*e* may communicate directly with the first communication device (e.g., using a D2D communications protocol) to transmit each capacity estimate. Alternatively, one or more of the capacity estimates may be transmitted to the first communication device via one or more of the relay candidates.

The relay communication module 750 may be used, following selection of a relay by the first communication device, to communicate with the first communication device, through the selected relay, via the receiver module 710 and transmitter module 730.

In other examples, the second communication device 115-*e* may be a destination communication device, such as the destination communication device 115-*b* described with reference to FIG. 2, and the first communication device may be a source communication device, such as the source communication device 115-*a* described with reference to FIG. 2. In some examples, the second communication device 115-*e* may be a source communication device, such as the source communication device 115-*a* described with reference to FIG. 2, and the first communication device may be a destination communication device, such as the destination communication device 115-*b* described with reference to FIG. 2. In either example, the plurality of relay candidates may be examples of aspects of the relay candidates 135 described with reference to FIG. 1 or 2.

Figure 8:
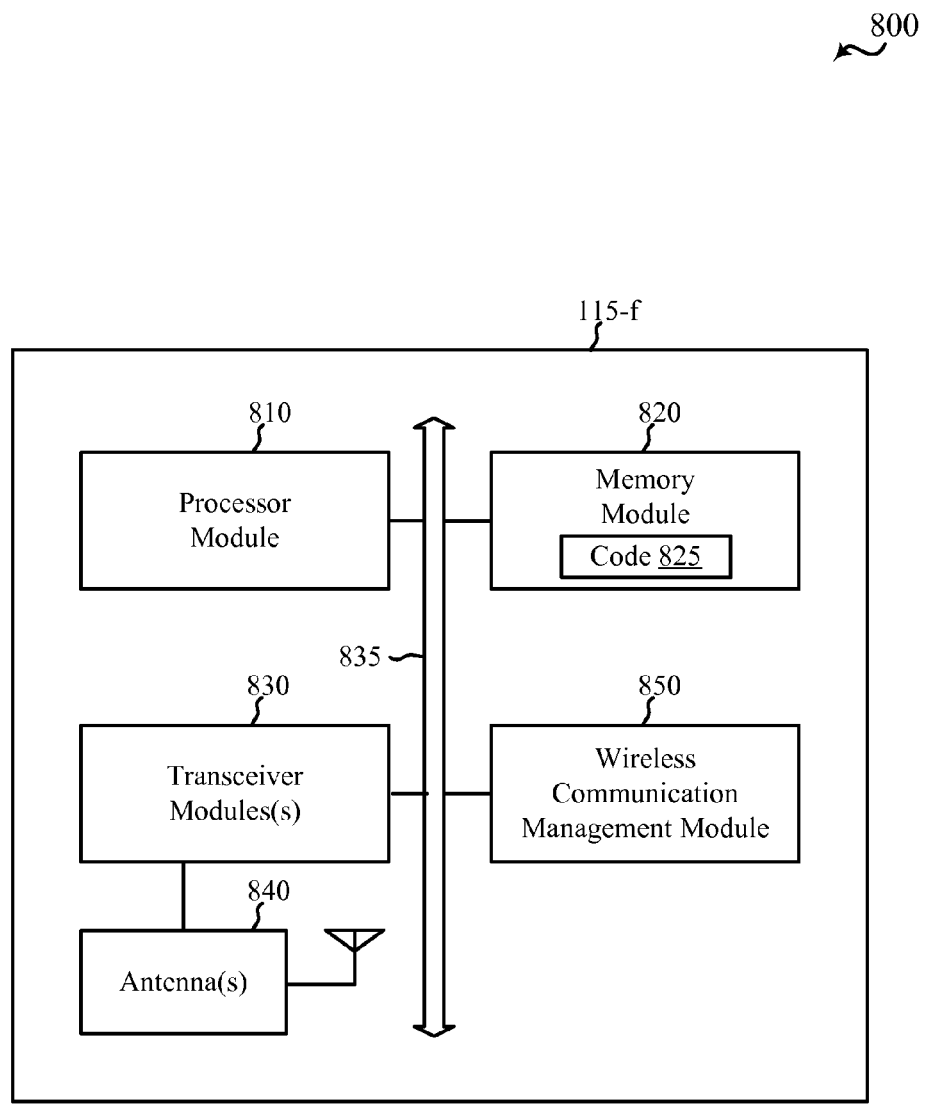
FIG. 8 shows a block diagram of a communication device (or UE) for use in wireless communication, in accordance with various aspects of the present disclosure.

FIG. 8 shows a block diagram 800 of a communication device (or UE) 115-*f* for use in wireless communication, in accordance with various aspects of the present disclosure. The communication device 115-*f* may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The communication device 115-*f* may, in some examples, have an internal power supply (not shown), such as a small battery, to facilitate mobile operation. In some examples, the communication device 115-*f* may be an example of aspects of one or more of the communication devices 115 described with reference to FIG. 1, 2, 4, 5, or 7. The communication device 115-*f* may be configured to implement at least some of the communication device features and functions described with reference to FIG. 1, 2, 3, 4, 5, or 7.

The communication device 115-*f* may include a processor module 810, a memory module 820, at least one transceiver module (represented by transceiver module(s) 830), at least one antenna (represented by antenna(s) 840), or a wireless communication management module 850. Each of these components may be in communication with each other, directly or indirectly, over one or more buses 835.

The memory module 820 may include random access memory (RAM) or read-only memory (ROM). The memory module 820 may store computer-readable, computer-executable code 825 containing instructions that are configured to, when executed, cause the processor module 810 to perform various functions described herein related to selecting a relay for communication with another communication device, or to facilitating a relay selection by another communication device.

The processor module 810 may include an intelligent hardware device, e.g., a central processing unit (CPU), a microcontroller, an ASIC, etc. The processor module 810 may process information received through the transceiver module(s) 830 or information to be sent to the transceiver module(s) 830 for transmission through the antenna(s) 840. The processor module 810 may handle, alone or in connection with the wireless communication management module 850, various aspects of communicating over (or managing communications over) a wireless spectrum (e.g., using a D2D or DRD communication protocol).

The transceiver module(s) 830 may include a modem configured to modulate packets and provide the modulated packets to the antenna(s) 840 for transmission, and to demodulate packets received from the antenna(s) 840. The transceiver module(s) 830 may, in some examples, be implemented as one or more transmitter modules and one or more separate receiver modules, as shown, for example, in FIG. 4, 5, or 7. The transceiver module(s) 830 may be configured to communicate bi-directionally, via the antenna(s) 840, with one or more other communication devices (including, for example, UEs, relays, or base stations). While the communication device 115-*f* may include a single antenna, there may be examples in which the communication device 115-*f* may include multiple antennas 840.

The wireless communication management module 850 may be configured to perform or control some or all of the communication device features or functions described with reference to FIG. 1, 2, 3, 4, 5, or 7 related to wireless communication. The wireless communication management module 850, or portions of it, may include a processor, or some or all of the functions of the wireless communication management module 850 may be performed by the processor module 810 or in connection with the processor module 810. In some examples, the wireless communication management module 850 may be an example of the wireless communication management module 420 described with reference to FIG. 4 or 5 or the wireless communication management module 720 described with reference to FIG. 7.

In some embodiments, a relay (or relay candidate), such as one or more of the relays (or relay candidates) 135 described with reference to FIG. 1, 2, or 6 may be configured similarly to the communication device 115-*f*, but with the wireless communication management module 850 being an example of the wireless communication management module 620 described with reference to FIG. 6, and with the processor module 810 configured to perform various functions described herein related to beacon signal transmission and facilitating relay selection by a communication device.

Figure 9:
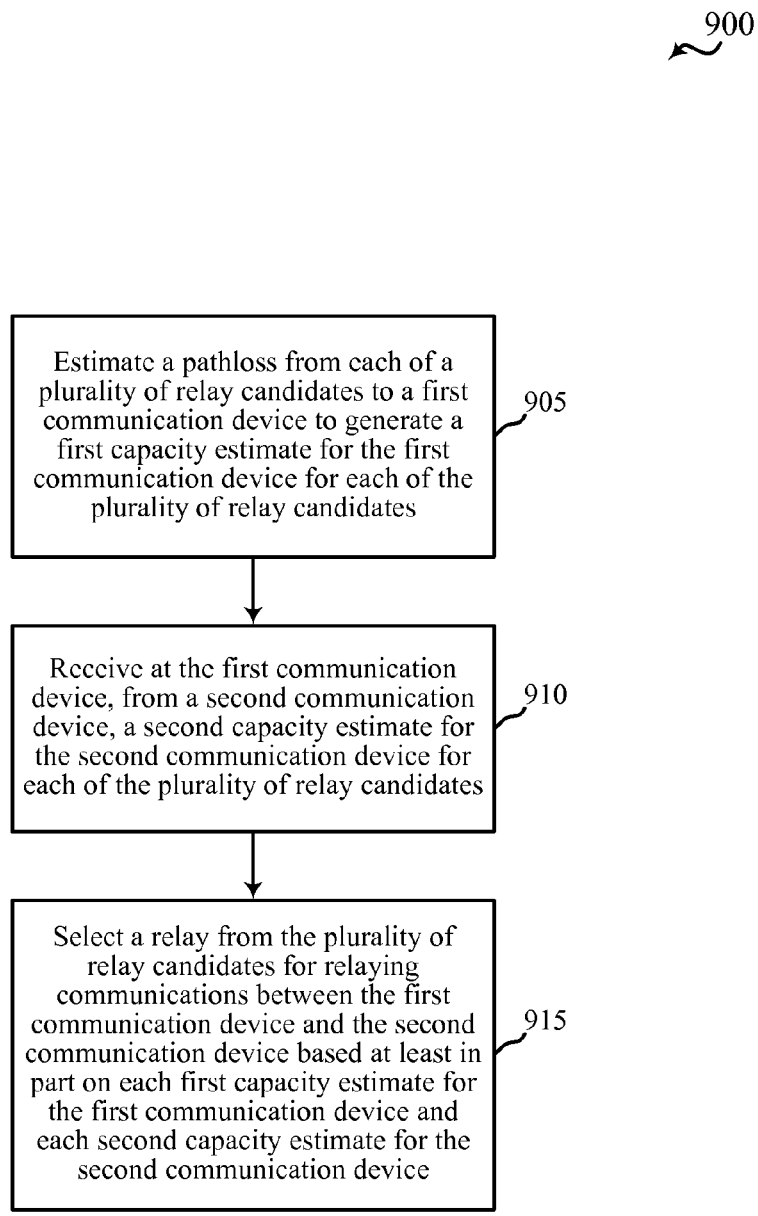
FIG. 9 is a flow chart illustrating an example of a method for wireless communication at a communication device, in accordance with various aspects of the present disclosure.

FIG. 9 is a flow chart illustrating an example of a method 900 for wireless communication at a communication device, in accordance with various aspects of the present disclosure. For clarity, the method 900 is described below with reference to aspects of one or more of the communication devices 115 described with reference to FIG. 1, 2, 4, 5, 7, or 8, and the plurality of relay candidates 135 described with reference to FIG. 1, 2, or 6. In some examples a communication device may execute one or more sets of codes to control the functional elements of the communication device to perform the functions described below. In some examples, the method 900 may be performed by a communication device during one or more relay selection periods.

At block 905, a first communication device may estimate a pathloss from each of a plurality of relay candidates to the first communication device to generate a first capacity estimate for the first communication device for each of the plurality of relay candidates. The operation(s) at block 905 may be performed using the wireless communication management module 420 or capacity estimate generation module 435 described with reference to FIG. 4 or 5.

At block 910, the first communication device may receive, from a second communication device, a second capacity estimate for the second communication device for each of the plurality of relay candidates. In some examples, each second capacity estimate may be based at least in part on a pathloss from one of the plurality of relay candidates to the second communication device. The operation(s) at block 910 may be performed using the wireless communication management module 420 or capacity estimate reception module 440 described with reference to FIG. 4 or 5.

At block 915, the first communication device may select a relay from the plurality of relay candidates for relaying communications between the first communication device and the second communication device. The relay may be selected based at least in part on each first capacity estimate for the first communication device and each second capacity estimate for the second communication device (e.g., based on end-to-end link capacity determinations). The operation(s) at block 915 may be performed using the wireless communication management module 420 or relay selection module 445 described with reference to FIG. 4 or 5.

Thus, the method 900 may provide for wireless communication. It should be noted that the method 900 is just one implementation and that the operations of the method 900 may be rearranged or otherwise modified such that other implementations are possible.

Figure 10:
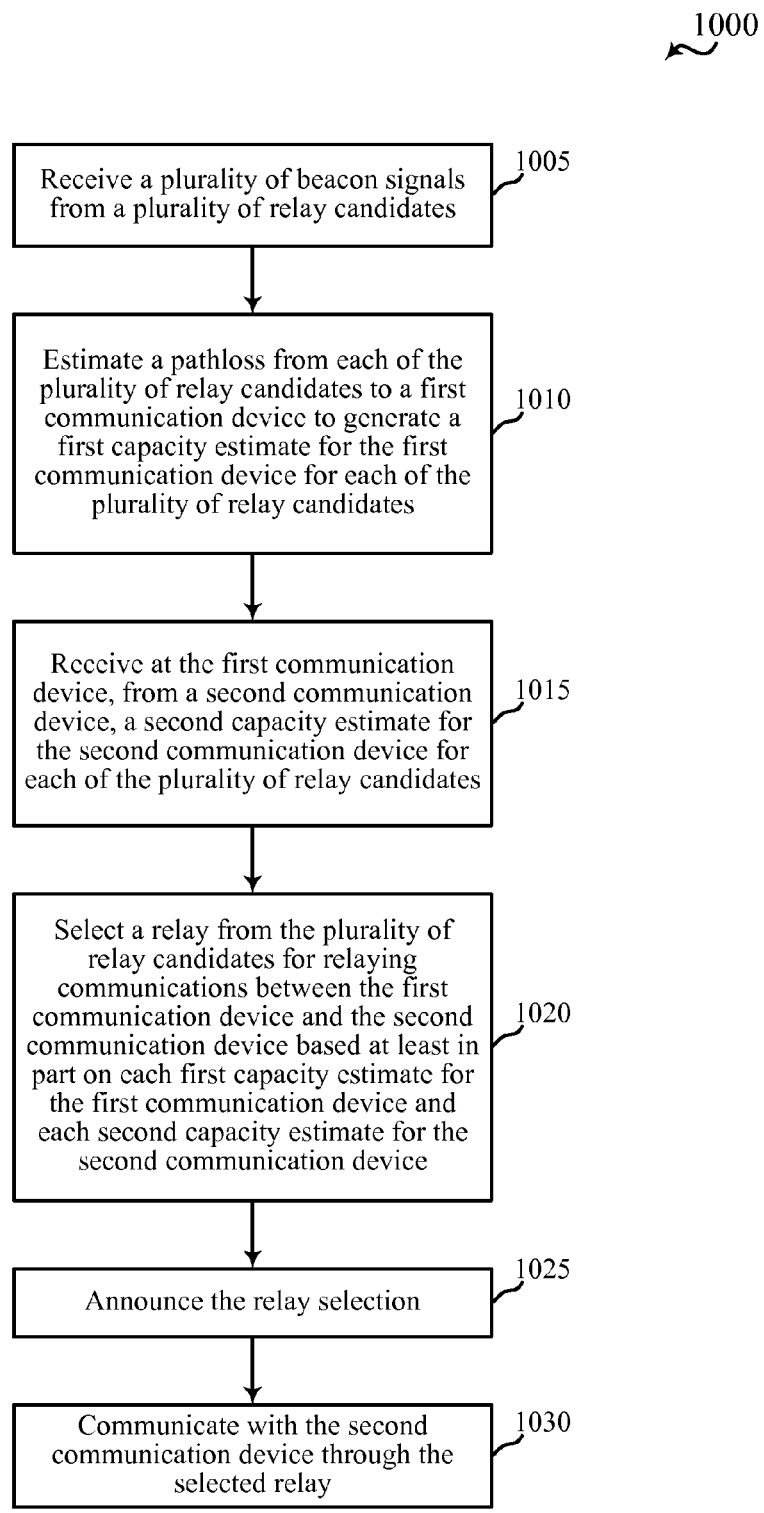
FIG. 10 is a flow chart illustrating an example of a method for wireless communication at a communication device, in accordance with various aspects of the present disclosure.

FIG. 10 is a flow chart illustrating an example of a method 1000 for wireless communication at a communication device, in accordance with various aspects of the present disclosure. For clarity, the method 1000 is described below with reference to aspects of one or more of the communication devices 115 described with reference to FIG. 1, 2, 4, 5, 7, or 8, and the plurality of relay candidates 135 described with reference to FIG. 1, 2, or 6. In some examples a communication device may execute one or more sets of codes to control the functional elements of the communication device to perform the functions described below. In some examples, the method 1000 may be performed by a communication device during one or more relay selection periods.

At block 1005, a first communication device may receive a plurality of beacon signals from a plurality of relay candidates. In some examples, each of the plurality of beacon signals may be received over a different time-frequency resource (or resources). Each beacon signal may be transmitted at a nominal power, to enable the first communication device to estimate a pathloss from each of the plurality of relay candidates to the first communication device. Other communication devices may also receive the beacon signals and estimate a pathloss from each of the plurality of relay candidates (or a subset thereof) to each of the other communication devices. The beacon signals may be received from the plurality of relay candidates during a one or a plurality of relay selection periods. The operation(s) at block 1005 may be performed using the wireless communication management module 420 described with reference to FIG. 4 or 5, or the beacon signal reception module 505 described with reference to FIG. 5.

At block 1010, the first communication device may estimate a pathloss from each of the plurality of relay candidates to the first communication device to generate a first capacity estimate for the first communication device for each of the plurality of relay candidates. In some examples, the first communication device may estimate the pathloss from each of the plurality of relay candidates to the first communication device based at least in part on the plurality of beacon signals (e.g., based on measurements (e.g., measured signal strengths) of the beacon signals, which may be compared to the nominal power of the beacon signals). The operation(s) at block 1010 may be performed using the wireless communication management module 420 or capacity estimate generation module 435 described with reference to FIG. 4 or 5.

At block 1015, the first communication device may receive, from a second communication device, a second capacity estimate for the second communication device for each of the plurality of relay candidates. The second capacity estimates may be received from the second communication device during a one or a plurality of relay selection periods (e.g., different sets of second capacity estimates may be received during different relay selection periods). In some examples, each second capacity estimate may be based at least in part on a pathloss from one of the plurality of relay candidates to the second communication device. In some examples, the first communication device may communicate directly with the second communication device (e.g., using a D2D communications protocol) to receive each second capacity estimate. Alternatively, one or more of the second capacity estimates may be received from, or via, one or more of the relay candidates. The operation(s) at block 1015 may be performed using the wireless communication management module 420 or capacity estimate reception module 440 described with reference to FIG. 4 or 5.

In some examples, the first communication device may generate a first capacity estimate for each of one or more relay candidates for which it does not receive a second capacity estimate. The first communication device may also receive a second capacity estimate for each of one or more relay candidates for which it does not generate a first capacity estimate.

At block 1020, the first communication device may select a relay from the plurality of relay candidates for relaying communications between the first communication device and the second communication device. The relay may be selected based at least in part on each first capacity estimate for the first communication device and each second capacity estimate for the second communication device (e.g., based on end-to-end link capacity determinations). The operation(s) at block 1020 may be performed using the wireless communication management module 420 or relay selection module 445 described with reference to FIG. 4 or 5.

At block 1025, the first communication device may announce its relay selection. In some examples, the announcement may be made in a broadcast announcement. In other examples, the announcement may be made in one or more transmissions to the selected relay and/or the second communication device. The operation(s) at block 1025 may be performed using the wireless communication management module 420 described with reference to FIG. 4 or 5, or the relay selection announcement module 510 described with reference to FIG. 5.

At block 1030, following selection of the relay, the first communication device may communicate with the second communication device through the selected relay. The operation(s) at block 1030 may be performed using the wireless communication management module 420 described with reference to FIG. 4 or 5, or the relay communication module 515 described with reference to FIG. 5.

Thus, the method 1000 may provide for wireless communication. It should be noted that the method 1000 is just one implementation and that the operations of the method 1000 may be rearranged or otherwise modified such that other implementations are possible.

In some embodiments, aspects of the methods 900 and 1000 described with reference to FIGS. 9 and 10 may be combined.

The detailed description set forth above in connection with the appended drawings describes exemplary embodiments and does not represent the only embodiments that may be implemented or that are within the scope of the claims. The term "example" or "exemplary," when used in this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable ROM (EEPROM), compact disk (CD)-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication, comprising:
   receiving, by a first mobile communication device, a plurality of beacon signals from a plurality of relay candidates during a relay selection period of a frame;
   estimating, by the first mobile communication device, a pathloss from each of the plurality of relay candidates to the first mobile communication device to generate a first capacity estimate for the first mobile communication device for each of the plurality of relay candidates;
   receiving, by the first mobile communication device, from a second mobile communication device, a second capacity estimate for the second mobile communication device for each of the plurality of relay candidates; and
   selecting, by the first mobile communication device, a relay from the plurality of relay candidates for relaying communications between the first mobile communication device and the second mobile communication device based at least in part on each first capacity estimate for the first mobile communication device and each second capacity estimate for the second mobile communication device.

2. The method of claim 1, wherein each second capacity estimate for the second mobile communication device is based at least in part on a pathloss from one of the plurality of relay candidates to the second mobile communication device.

3. The method of claim 1, further comprising:
communicating directly with the second mobile communication device to receive each second capacity estimate for the second mobile communication device for each of the plurality of relay candidates.

4. The method of claim 3, further comprising:
communicating with the second mobile communication device through the relay following selection of the relay.

5. The method of claim 3, wherein the first mobile communication device communicates directly with the second mobile communication device using a device-to-device (D2D) communications protocol.

6. The method of claim 1,
wherein the pathloss from each of the plurality of relay candidates to the first mobile communication device is based at least in part on one of the plurality of beacon signals.

7. The method of claim 6, wherein each of the plurality of beacon signals is received over a different time-frequency resource.

8. The method of claim 6, wherein the plurality of beacon signals are received from the plurality of relay candidates during a signaling phase of the relay selection period, the relay selection period comprising the signaling phase and at least one of an information exchange phase or a relay announcement phase.

9. The method of claim 6, wherein the plurality of beacon signals are received from the plurality of relay candidates during a plurality of relay selection periods.

10. An apparatus associated with a first mobile communication device for wireless communication, comprising:
means for receiving a plurality of beacon signals from a plurality of relay candidates during a relay selection period of a frame;
means for estimating a pathloss from each of the plurality of relay candidates to the first mobile communication device to generate a first capacity estimate for the first mobile communication device for each of the plurality of relay candidates;
means for receiving from a second mobile communication device, a second capacity estimate for the second mobile communication device for each of the plurality of relay candidates; and
means for selecting a relay from the plurality of relay candidates for relaying communications between the first mobile communication device and the second mobile communication device based at least in part on each first capacity estimate for the first mobile communication device and each second capacity estimate for the second mobile communication device.

11. The apparatus of claim 10, wherein each second capacity estimate for the second mobile communication device is based at least in part on a pathloss from one of the plurality of relay candidates to the second mobile communication device.

12. The apparatus of claim 10, further comprising:
means for communicating directly with the second mobile communication device to receive each second capacity estimate for the second mobile communication device for each of the plurality of relay candidates.

13. The apparatus of claim 12, further comprising:
means for communicating with the second mobile communication device through the relay following selection of the relay.

14. The apparatus of claim 12, wherein the first mobile communication device communicates directly with the second mobile communication device using a device-to-device (D2D) communications protocol.

15. The apparatus of claim 10,
wherein the pathloss from each of the plurality of relay candidates to the first mobile communication device is based at least in part on one of the plurality of beacon signals.

16. The apparatus of claim 15, wherein each of the plurality of beacon signals is received over a different time-frequency resource.

17. The apparatus of claim 15, wherein the plurality of beacon signals are received from the plurality of relay candidates during a signaling phase of the relay selection period, the relay selection period comprising the signaling phase and at least one of an information exchange phase or a relay announcement phase.

18. The apparatus of claim 15, wherein the plurality of beacon signals are received from the plurality of relay candidates during a plurality of relay selection periods.

19. An apparatus associated with a first mobile communication device for wireless communication, comprising:
a processor;
memory in electronic communication with the processor; and
instructions stored in the memory, the instructions being executable by the processor to:
receive a plurality of beacon signals from a plurality of relay candidates during a relay selection period of a frame;
estimate a pathloss from each of the plurality of relay candidates to the first mobile communication device to generate a first capacity estimate for the first mobile communication device for each of the plurality of relay candidates;
receive at the first mobile communication device, from a second mobile communication device, a second capacity estimate for the second mobile communication device for each of the plurality of relay candidates; and
select a relay from the plurality of relay candidates for relaying communications between the first mobile communication device and the second mobile communication device based at least in part on each first capacity estimate for the first mobile communication device and each second capacity estimate for the second mobile communication device.

20. The apparatus of claim 19, wherein each second capacity estimate for the second mobile communication device is based at least in part on a pathloss from one of the plurality of relay candidates to the second mobile communication device.

21. The apparatus of claim 19, wherein the instructions are executable by the processor to:
communicate directly with the second mobile communication device to receive each second capacity estimate for the second mobile communication device for each of the plurality of relay candidates.

22. The apparatus of claim 21, wherein the instructions are executable by the processor to:

communicate with the second mobile communication device through the relay following selection of the relay.

23. The apparatus of claim 21, wherein the first mobile communication device communicates directly with the second mobile communication device using a device-to-device (D2D) communications protocol.

24. The apparatus of claim 19, wherein
the pathloss from each of the plurality of relay candidates to the first mobile communication device is based at least in part on one of the plurality of beacon signals.

25. The apparatus of claim 24, wherein each of the plurality of beacon signals is received over a different time-frequency resource.

26. The apparatus of claim 24, wherein the plurality of beacon signals are received from the plurality of relay candidates during a signaling phase of the relay selection period, the relay selection period comprising the signaling phase and at least one of an information exchange phase or a relay announcement phase.

27. The apparatus of claim 24, wherein the plurality of beacon signals are received from the plurality of relay candidates during a plurality of relay selection periods.

28. A non-transitory computer-readable medium for storing instructions executable by a processor associated with a first mobile communication device, comprising:
instructions to receive a plurality of beacon signals from a plurality of relay candidates during a relay selection period of a frame;
instructions to estimate a pathloss from each of the plurality of relay candidates to the first mobile communication device to generate a first capacity estimate for the first mobile communication device for each of the plurality of relay candidates;
instructions to receive at the first mobile communication device, from a second mobile communication device, a second capacity estimate for the second mobile communication device for each of the plurality of relay candidates; and
instructions to select a relay from the plurality of relay candidates for relaying communications between the first mobile communication device and the second mobile communication device based at least in part on each first capacity estimate for the first mobile communication device and each second capacity estimate for the second mobile communication device.

29. The non-transitory computer-readable medium of claim 28, further comprising:
instruction to communicate directly with the second mobile communication device to receive each second capacity estimate for the second mobile communication device for each of the plurality of relay candidates.

30. The non-transitory computer-readable medium of claim 28,
wherein the pathloss from each of the plurality of relay candidates to the first mobile communication device is based at least in part on one of the plurality of beacon signals.

* * * * *